(12) United States Patent
Ladan-Mozes et al.

(10) Patent No.: US 6,850,969 B2
(45) Date of Patent: Feb. 1, 2005

(54) LOCK-FREE FILE SYSTEM

(75) Inventors: Edya Ladan-Mozes, Tel Aviv (IL); Dan Touitou, Ramat Gan (IL); Ohad Rodeh, Tel Aviv (IL)

(73) Assignee: International Business Machined Corporation, Armonk, NY (US)

( * ) Notice: Subject to any disclaimer, the term of this patent is extended or adjusted under 35 U.S.C. 154(b) by 491 days.

(21) Appl. No.: 10/106,486

(22) Filed: Mar. 27, 2002

(65) Prior Publication Data

US 2003/0217058 A1 Nov. 20, 2003

(51) Int. Cl.[7] .............................................. G06F 13/00
(52) U.S. Cl. ........................ 709/213; 710/200; 711/150
(58) Field of Search ........................ 709/213; 710/200; 711/150

(56) References Cited

U.S. PATENT DOCUMENTS 5,499,356 A  *  3/1996  Eckert et al. ................ 711/152

OTHER PUBLICATIONS

"Linear Hashing" and "Extendible Hashing"; identified as CS453 Lectures 19 and 18, respectively; 6 pages and 11 pages, respectively; author and date unknown (submitted by applicant as citation "AU").*
Pawlowski et al., "NFS Version 3 Design and Implementation", USENIX Summer, 1994, Boston Massachusetts.
Best et al., "How the Journaled File System Handles the on–Disk Layout", Linux Technology Center IBM, 2000.
Guy et al., "Implementation of the Ficus Replicated File System", The Proceedings of the Summer USENIX Conference, Anaheim, CA Jun. 1990, pp. 63–71.
Wang et al., "xFS: A Wide Area Mass Storage File System", University of California, 1993.
Gibson et al.; "File Server Scaling with Network–Attached Secure Disks", Proceedings of the ACM International Conference on Measurement and Modeling of Computer Systems, Seattle, Washington, Jun. 15–18, 1997.
Soltis et al., "The Gobal File System", Proceedings of the Fifth NASA Goddard Space Flight Center Conference on Mass Storage Systems and Technologies, (College Park, Maryland 1996).
Amiri et al., "Highly Concurrent Shared Storage", Appears in the Proceedings of the International Conference on Distributed Computing Systems, Taipei, Apr. 2000.
Anderson et al., "Serverless Network File Systems", the 15th ACM Symposium on Operating Systems Principles, Dec. 1995.
Gibson et al ., "File Systems for Network–Attached Secure Disks", 1997, available at: www.pdl.cmu.edu/publications/index.html#NASD.
Akinlar et al. "Autonomous Disks: The Building Block for Scalable Distributed File System", Proceeding of the 15th International Workshop on Multimedia Information Systems, MIS 1999, California.

(List continued on next page.)

*Primary Examiner*—David L. Robertson
(74) *Attorney, Agent, or Firm*—Browdy and Neimark, P.L.L.C.

(57) ABSTRACT

A method for storage and retrieval of information includes coupling a plurality of clients to communicate with a storage device via a network, and reading out data from a selected location on the storage device to a memory of one of the clients. After the client has modified the data in the memory, the storage device determines whether the modified data can be written back to the selected location as part of an atomic operation together with the reading out and modifying of the data. The modified data is stored in the selected location only after verifying that the modified data can be written back to the selected location as part of the atomic operation.

83 Claims, 7 Drawing Sheets

OTHER PUBLICATIONS

Riedel et al., "Active Disks—Remote Execution for Network–Attached Storage", School of Computer Science, Carnegie Mellon University, Dec. 1997.

O'Keefe, "Shared File Systems and Fibre Channel", Fifteenth IEEE Symposium on Mass Storge Systems, Mar. 23–26, 1998.

Shavit et al., "Software Transactional Memory", the $14^{th}$ ACM Symposium on the Princples of Distributed Computing, Ottowa, Ontario, Canada, 1995.

Lamport, "The Part–Time Parliament", ACM Trans. on Computer Systems, vol. 16, No. 2, May 1998, pp. 133–169.

Massalin et al., "A Lock–Free Multiprocessor OS Kernel", Technical Report No.: CUCS–005–91, Jun. 1991, New York.

Herlihy, "Wall–Free Synchronization", ACM Trans. on Programming Languages and Systems, vol. 11, No. 1 Jan. 1991, pp. 124–149.

"General parallel File System (GPFS) 1.4 for AIX: Architecture and Performance", available at: www,1.ibm.com/servers/eserver/clusters/whitepapers/gpfs_aix.html. Jan. 2002.

Herlihy, "A Methodology for Implementing Highly Concurrent Data Objects", ACM Transactions on Programming Languages and systems 15:15, Nov. 1993, pp. 745–770.

Thekkath, et al., "Frangipani: A Scalable Distributed File System", SOSP No. 16, 1997.

www.SNIA.ORG/English/Work_Groups/OSD/index.html. Jan. 2002.

* cited by examiner

LOCK-FREE FILE SYSTEM

FIELD OF THE INVENTION

The present invention relates generally to data storage systems, and specifically to file systems that support sharing of storage devices among multiple clients.

BACKGROUND OF THE INVENTION

Distributed file systems are traditionally built around central file servers, which manage and control access to files stored on disk. Clients send file system commands, such as create, read and write, over a network to be executed on the server. Data transfers to and from the disk pass through the server memory. Examples of distributed file systems include Sun Microsystems' Network File System (NFS™), Novell Netware™, Microsoft's Distributed File System, and IBM/Transarc's DFS™. As file systems and storage networks grow, the file server increasingly becomes a bottleneck in storage access and limits scalability of the system.

In response to this problem, new parallel-access, shared storage systems have been developed, which allow applications on multiple client nodes in a network to share storage devices and file data without mediation of a central file server as in traditional distributed file systems. These systems typically reduce server workload by distributing its functionality among other components—server cluster, clients and disks. An example of a file system for this type of shared storage is IBM's General Parallel File System (GPFS), which is a UNIX-style file system designed for IBM RS/6000 multiprocessor computing platforms. GPFS is described, for example, in a publication entitled "General Parallel File System (GPFS) 1.4 for AIX: Architecture and Performance," which is available at www-1.ibm.com/servers/eserver/clusters/whitepapers/gpfs_aix.html. GPFS is based on a shared disk model that provides low-overhead access to disks not directly attached to the application nodes, using a cluster of file servers to provide high-speed access to the same data from all nodes of the system.

The need for a locking mechanism is common to distributed shared-storage file systems known in the art, in order to maintain atomicity of operations, and thus ensure full data coherence. In the context of the present patent application and in the claims, an operation is said to be performed atomically if from the point of view of the system state, the operation has either been completed, effectively instantaneously, or if not, the operation has not occurred at all. Locking may be performed either at a file server or lock server, or at the storage devices themselves, and may be either centralized or distributed. GPFS, for example, uses a distributed, token-based locking protocol for this purpose. A token manager grants lock tokens to client nodes upon request, and revokes them when other nodes make conflicting requests. A node can read or write file data or metadata only after it obtains the proper token.

As another example, the Global File System (GFS) uses a locking mechanism maintained by the storage device controllers. GFS is described by Soltis et al., in "The Global File System," *Proceedings of the Fifth NASA Goddard Space Flight Center Conference on Mass Storage Systems and Technologies* (College Park, Maryland, 1996), which is incorporated herein by reference. Other systems use group communication messaging protocols or lock servers. In any case, the overhead associated with locking prevents such shared-storage systems from growing beyond several hundred nodes.

Modern disks used in shared storage systems are typically independent units, with their own computational power. This computational power can be used to take over some of the functions previously performed by servers, such as allocation and protection. In this vein, object-based storage devices (OBSDs) are being developed to move low-level storage functions into the storage device itself, and thus to permit clients to access the device through a standard object interface rather than a traditional block-based interface. (Essentially, an OBSD can be constructed by layering a thin operating system on top of a conventional disk machine.) This higher-level storage abstraction enables cross-platform solutions by pushing the low-level functions down to the device —functions that would normally be implemented differently on different platforms. Furthermore, the direct-access nature of OBSDs enables scalable, high-performance solutions, as there are no potential bottlenecks in the system between the hosts and the storage devices. The basic concepts of OBSDs (also known as OSDs) are described at www.snia.org/English/Work_Groups/OSD/index.html.

OBSDs are particularly useful in storage area networks (SANs), in which disks and clients communicate directly over a network, without intervening servers. Gibson et al., for example, describe an implementation of OBSDs for this purpose in "File Systems for Network-Attached Secure Disks" (1997), which is incorporated herein by reference. This publication is available at www.pdl.cmu.edu/publications/index.html#NASD. A network-attached secure disk (NASD) drive, like other OBSDs, stores variable-length, logical byte streams called objects. Client file systems wanting to allocate storage for a new file request one or more objects to hold the file's data. Read and write operations apply to a byte region (or multiple regions) within an object. The layout of an object on the physical media is determined by the NASD drive and is transparent to the client.

In multiprocessor operating systems, read-modify-write (RMW) operations are used to solve problems of synchronization in access to shared memory. RMW operations read data, update it and write it back to the memory atomically, so that the processor performing the operation does not need a lock to ensure data consistency. A particular RMW operation, known as load-linked store-conditional, was defined by Herlihy, in "A Methodology for Implementing Highly Concurrent Data Objects," *ACM Transactions on Programming Languages and Systems* 15:5 (November, 1993), pages 745–770, which is incorporated herein by reference. To update a data structure indicated by a pointer, the processor first copies it into a new allocated block of memory, makes changes on the new version, and switches the pointer to the new version if appropriate conditions are met.

SUMMARY OF THE INVENTION

Preferred embodiments of the present invention provide a lock-free distributed file system, which allows multiple clients to access shared disk storage directly, without servers or managers. The system uses a novel read-modify-write scheme to ensure that clients execute their file operations atomically without the need for locking. As a result, file systems in accordance with preferred embodiments of the present invention are free of the overhead imposed by locking requirements in shared-storage filing systems known in the art, and are scalable in principle to an unlimited number of clients and volume of storage space.

In some preferred embodiments of the present invention, the shared disk storage is based on object-based storage devices (OBSDS). The devices are enhanced so as to support load-linked disk (LLD) read and store-conditional disk (SCD) write operations used by the lock-free file system (LFFS) of the present invention. To create, change or delete any object stored by one of the OBSDs, a client performs a LLD read of data from the object. After reading and modifying the data, the client submits a SCD write to the OBSD. The OBSD will store the modified data only if there has been no other change to the byte range in question in the interim.

Preferably, this process is handled by issuing a "ticket" from the OBSD to the client as part of the LLD read. The ticket typically comprises a running index, representing the state of the object at the time of reading, which is also saved in volatile memory by the OBSD. The client submits the ticket as part of the SCD write attempt, and the OBSD checks the ticket against the copy in its memory to determine whether to complete the operation. If the ticket does not correspond to the copy in the memory (having been invalidated, for example, due to a SCD write by another client), the SCD operation fails. The file system makes no assumptions as to the success of the LLD and SCD operations, and continues to function in an orderly fashion whether they succeed or fail.

Thus, each of the OBSDs can function autonomously, substantially without external management, and without the use of locks of any kind. Each of the clients communicates directly with each of the OBSDs, and there is no need for either communications among the clients or communications among the OBSDs to maintain the required synchronization.

Although the preferred embodiments described herein are built around OBSDs, the principles of the present invention are also applicable to network-attached storage devices of other types. For example, devices that use conventional block-based interfaces may also be adapted to provide the LLD and SCD operations described above, and thus can support lock-free shared storage in conjunction with a suitable file system.

There is therefore provided, in accordance with a preferred embodiment of the present invention, a method for storage of information, including:

coupling a plurality of clients to communicate with a storage device via a network;

reading out data from a selected location on the storage device to a memory of one of the clients;

modifying the data in the memory;

determining whether the modified data can be written back to the selected location on the storage device as part of an atomic operation together with the reading out and modifying of the data; and storing the modified data in the selected location only after verifying that the modified data can be written back to the selected location as part of the atomic operation.

Preferably, reading out the data includes obtaining a ticket from the storage device, the ticket indicating a status of the data. Determining whether the modified data can be written back includes evaluating validity of the ticket so as to verify that the status of the data on the storage device has not been changed since the ticket was obtained. Most preferably, the ticket is indicative of the status of the data at a time at which the data were read out from the selected location, and the ticket is invalidated if another client performed a storage operation to the selected location subsequent to the time at which the data were read out. Further preferably, evaluating the validity of the ticket includes submitting the ticket from the client to the storage device, and comparing the submitted ticket to a ticket copy held in a memory of the storage device.

Preferably, storing the modified data includes storing the data substantially without having obtained a lock on the selected location.

Additionally or alternatively, reading out the data includes determining that another client is applying a modification to the data from the selected location, and modifying the data includes deciding how to modify the data responsive to a status of the modification being applied by the other client. Typically, reading out the data includes reading metadata from the selected location on the storage device, the metadata including a flag indicative of the status of the modification, and deciding how to modify the data includes making a decision on modifying the data responsive to the flag. Preferably, modifying the data includes setting the flag to indicate the status of the modification. Most preferably, storing the modified data includes resetting the flag to a null value after the modification is completed.

Further additionally or alternatively, deciding how to modify the data includes determining that the modification applied by the other one of the clients has reached a no-return stage, and responsive to the no-return stage, deciding to help to complete the modification. Preferably, modifying the data includes publishing the modification to be applied to the data, and deciding to help includes receiving the published modification, and helping to complete the modification responsive thereto. Alternatively, deciding how to modify the data includes deciding to interfere with the modification, so as to prevent the modification and enable the client to store its own modified data in the selected location.

Preferably, reading out the data includes reading metadata from the selected location on the storage device with respect to a data structure stored on the storage device, the metadata including a metadata timestamp corresponding to a time at which a change was made in the metadata, and determining whether the modified data can be written back to the selected location includes verifying that the metadata are correct responsive to the metadata timestamp. Typically, the data structure is one of a group of data structures consisting of a file and a directory. Preferably, the data structure includes one or more data objects having respective data timestamps associated therewith, and verifying that the metadata are correct includes determining that another concurrent operation has not occurred by comparing the data timestamps to the metadata timestamp.

In a preferred embodiment, the storage device includes an object-based storage device (OBSD), and reading out the data includes selecting an object on the OBSD and reading out a range of the data from the object, and storing the modified data includes writing the modified data back to the selected object. Preferably, selecting the object includes finding an entry in a file system directory stored on the OBSD that points to the object, the entry associating a name of a data structure in the file system with the object.

Typically, the data structure includes a file, and the object pointed to by the entry contains metadata of the file. Preferably, the metadata of the file points to one or more further objects containing the data to be read out. Most preferably, coupling the plurality of the clients to communicate with the storage device includes coupling at least first and second OBSDs to communicate with the clients, wherein the metadata is on the first OBSD, while at least one of the further objects to which the metadata points is on the second OBSD. Additionally or alternatively, modifying the data includes performing an operation on the file, wherein the operation is selected from a group of operations consisting of creating the file, deleting the file, writing to the file and truncating the file.

Alternatively, the data structure includes a subdirectory, and wherein the object pointed to by the entry contains further entries corresponding to entities in the subdirectory.

In a preferred embodiment, coupling the plurality of the clients to communicate with the storage device includes connecting the clients and the storage device to communicate over a packet network.

Preferably, coupling the plurality of the clients to communicate with the storage device includes coupling multiple storage devices to communicate simultaneously with the clients, and reading out the data includes selecting one of the storage devices from which to read out the data. In a preferred embodiment, storing the modified data includes storing the data in a data file that is spread over two or more of the storage devices. Preferably, storing the modified data includes storing the data substantially without dependence on communication among the multiple storage devices with respect to the operation.

Further preferably, storing the modified data includes storing the data substantially without dependence on communication among the plurality of the clients with respect to the operation.

There is also provided, in accordance with a preferred embodiment of the present invention, apparatus for storing data, including:

at least one data storage device; and a plurality of clients, coupled to the storage device by a communication network, each such client including a memory and a central processing unit (CPU), which is arranged to read out the data from a selected location on the at least one storage device to the memory of the client, to modify the data in the memory, and to submit the modified data to the at least one storage device for storage in the selected location, such that the modified data are stored in the selected location only after the at least one storage device has verified that the modified data can be written back to the selected location as part of an atomic operation together with reading out and modifying the data.

There is additionally provided, in accordance with a preferred embodiment of the present invention, a computer software product, including a computer-readable medium in which program instructions are stored, the instructions defining a file system for use by a plurality of client computers coupled by a communication network to communicate with at least one storage device, and which instructions, when read by a client computer among the plurality of client computers, cause the computer to read out the data from a selected location on the at least one storage device, to modify the data, and to submit the modified data to the at least one storage device for storage in the selected location, such that in accordance with the instructions, the modified data are stored in the selected location only after verifying that the modified data can be written back to the selected location as part of an atomic operation together with reading out and modifying the data.

There is further provided, in accordance with a preferred embodiment of the present invention, a device for storing data, including:

a storage medium arranged to store the data; and a processing unit coupled to control access by clients to the storage medium by providing an object-based interface to the clients, which interface enables the clients to select an object on the storage medium and to read out a range of the data from the selected object, to modify the data, and to submit the modified data to the processing unit for storage in the selected object, such that the processing unit allows the modified data to be stored in the selected object only after verifying that the modified data can be written back to the selected location as part of an atomic operation together with reading out and modifying the data.

The present invention will be more fully understood from the following detailed description of the preferred embodiments thereof, taken together with the drawings in which:

DETAILED DESCRIPTION OF PREFERRED EMBODIMENTS

A. System Overview and Basic Operations

Figure 1:
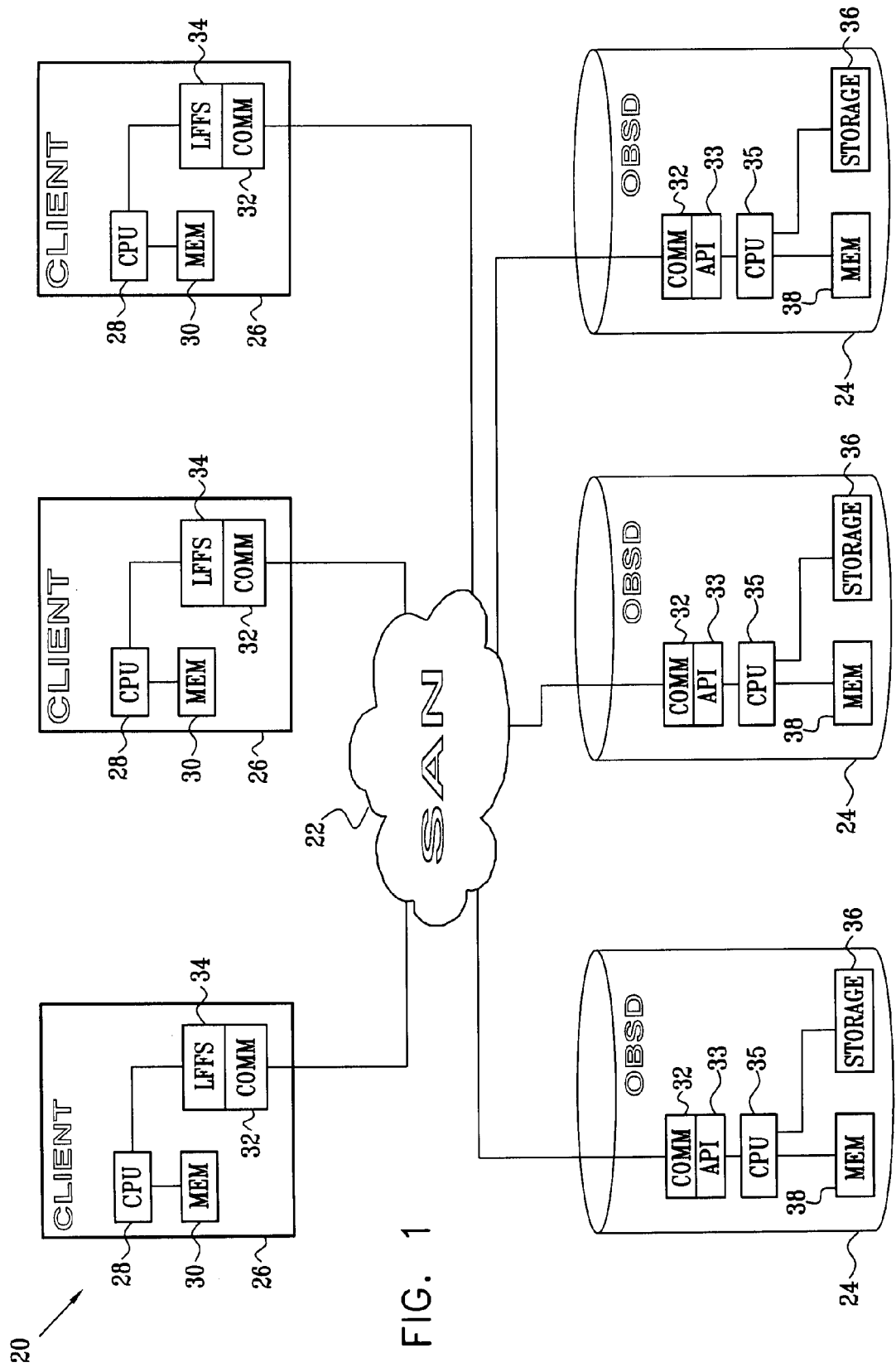
FIG. 1 is a block diagram that schematically shows a storage system, in accordance with a preferred embodiment of the present invention.

FIG. 1 is a block diagram that schematically illustrates a computing system 20 with shared data storage, in accordance with a preferred embodiment of the present invention. System 20 is preferably built around a packet network, such as a storage area network (SAN) 22, although other types of communication networks may similarly be used. The system comprises one or more object-based storage devices (OBSDs) 24, linked by network 22 to multiple clients 26. The clients are typically host computers, having a central processing unit (CPU) 28 and a local memory 30. The clients and OBSDs communicate with one another over network 22 using a suitable communication protocol 32 (or protocol stack). Preferably, protocol 32 comprises a reliable transport protocol, such as the Transmission Control Protocol (TCP), which typically runs over a standard Internet Protocol (IP). Alternatively, other communication protocols may be used, as are known in the art.

OBSDs 24 are preferably implemented using highly-available disk machines, as are known in the storage art, comprising disk storage 36, as well as a volatile memory 38 for caching and processing functions. The disk machines have their own CPU 35, which is used to perform functions, such as allocation, that are generally the responsibility of servers in traditional distributed storage systems. The OBSDs thus provide an object-based interface for use by clients 26, as described in the Background of the Invention. Preferably, all the OBSDs are available for use by any of the clients.

Clients 26 perform file operations on OBSDs 24 using a Lock-Free File System (LFFS) 34. The LFFS is typically implemented in software program code, which may be downloaded to clients 26 electronically, over network 22, for example, or may alternatively be supplied on tangible media, such as CD-ROM. LFFS 34 does not maintain information about the global state of system 20 or of objects (such as open files) on OBSDs 24. Instead, it uses special read-modify-write (RMW) operations to maintain data consistency, without the use of locks. These RMW operations are provided by a novel application program interface (API) 33, which is added to the conventional functionality of OBSDs 24, as described in detail hereinbelow. The normal operation of LFFS 34 is unaffected when clients 26 fail or become disconnected from network 22, even for extended periods of time.

Using LFFS 34 and API 33, clients 26 are preferably able to invoke the following storage functions, supported by OBSDs 24:

TABLE I

OBSD FUNCTIONS

Create (object_id) - Create an object identified by object_id.
Delete (object_id) - Delete an object.
Read (object_id, offset, count) - Reads count bytes from object_id, starting at offset. Returns the byte array read.
Write (object_id, offset, count, data) - Writes count bytes of data to offset within the object_id. Allocate space if needed.
Append (object_id, count, data) - Writes count bytes of data to the end of object_id.
Truncate (object_id, offset) - Deletes object_id data from offset until the end of the object.
Rename (old_object_id, new_object_id) - Change the name of the object old_object_id to the name new_object_id. All other object characteristics remain the same.
Length (object_id) - returns the object length.

Invocation of some of these functions using LFFS 34 and API 33 is described below in detail.

Figure 2:
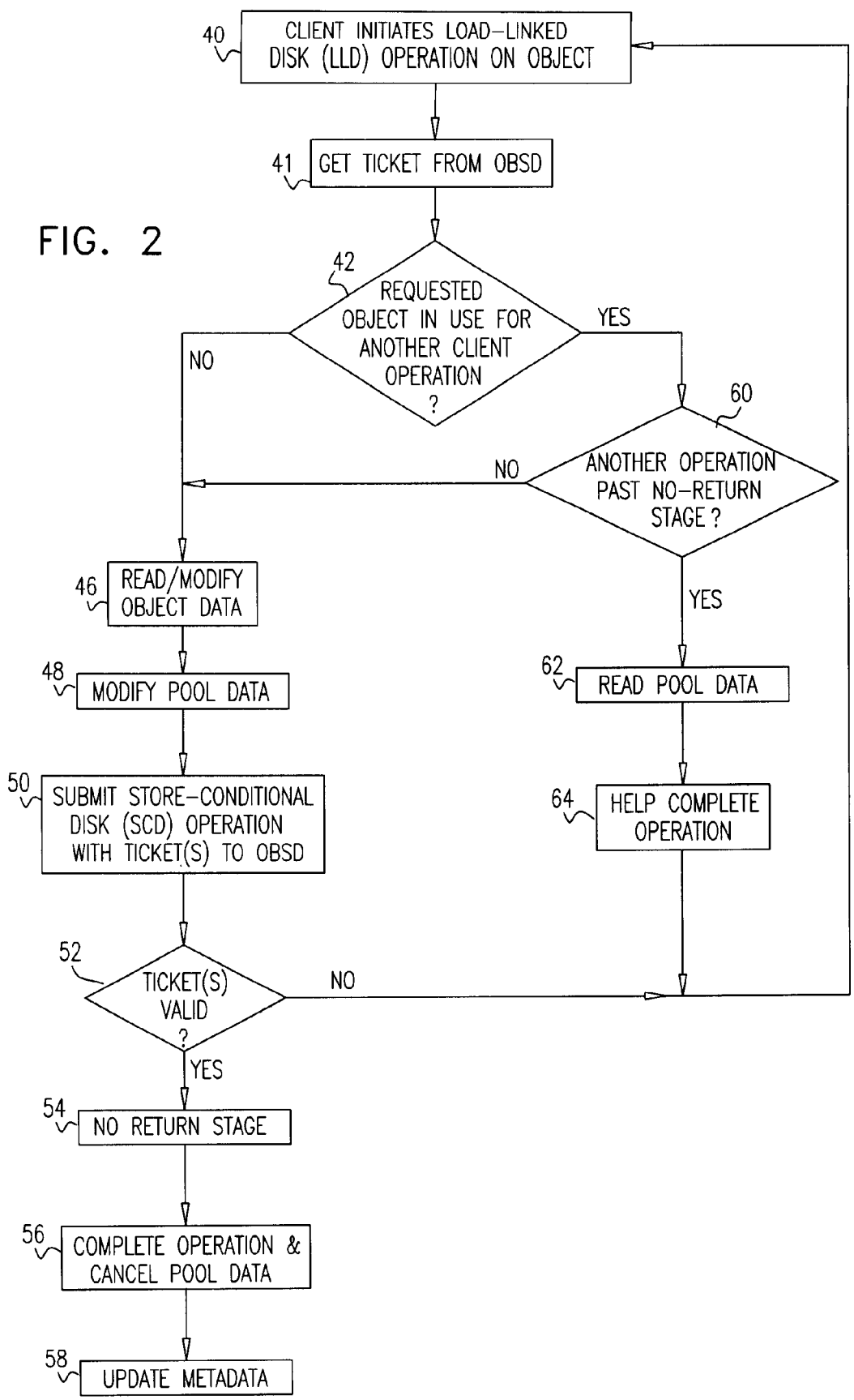
FIG. 2 is a flow chart that schematically illustrates a method for operating on a data object stored by an object-based storage device (OBSD), in accordance with a preferred embodiment of the present invention.

FIG. 2 is a flow chart that schematically illustrates a method used by clients 26 for operating on objects in OBSDs 24, in accordance with a preferred embodiment of the present invention. This method maintains consistency of the state of the file system using RMW operations provided by API 33. These operations are referred to herein as Load-Linked Disk (LLD) and Store-Conditional Disk (SCD), as described below. They are described in a general way in FIG. 2, in order to clarify the operating principles of LFFS 34 and to aid in understanding the specific implementation details presented in the figures that follow. Not all the features of the abstract method illustrated by FIG. 2 are applicable to all the types of file operations performed by LFFS 34. In particular, there are some important differences in operations that involve data objects in the files, such as truncate, write and read (which are referred to herein as "common operations"). Write and truncate operations are described specifically hereinbelow.

To begin a file system operation that accesses a given object on OBSD 24, client 26 initiates a LLD operation to read a specified byte range from the object, at a LLD step 40.

The LLD request issued by the client has the semantics LLD (object_id, offset, count), wherein the offset and count indicate the byte range to be read. If the read is successful, the OBSD issues a "ticket" to the client, at a ticket issuance step 41, along with the data that the client has requested. The ticket represents the current state of the object and byte range, indicating the last time the contents of the byte range were changed, preferably by means of a globally-unique running index. The OBSD saves a copy of the ticket in memory 38. When the contents of the byte range are changed, the OBSD invalidates any old tickets that are outstanding on this byte range or any part of it.

Client 26 may determine at this stage that another client is in the midst of performing a file operation on the object in question, at an object checking step 42. This determination is preferably based on a system of flags created by LFFS 34, as described in detail hereinbelow. Assuming the object is not in use, client 26 modifies the data as required, at a read/modify step 46. In preparation for storing the modification to the OBSD, the client prepares information about the operation that it is about to execute, referred to hereinafter as "pool data" or "pool bytes," at a pool data modification step 48. The pool bytes are stored in a data structure maintained by LFFS 34 on OBSD 24, as described hereinbelow with reference to FIG. 3. This information contains all the variables that will be needed by other clients to complete the requested operation, in case the original client fails or is excluded from communicating with the OBSD before the operation is completed.

To store the modified data on OBSD 24 (including the modified pool data), client 26 submits a SCD request to the OBSD, at a SCD initiation step 50. The SCD request has the semantics SCD(object_id, ticket_list, offset, data), and returns a binary success value. As can be seen from the form of the request, the client submits any relevant tickets it has received in the preceding LLD operation(s), along with the data to be written to storage 36. The OBSD checks the validity of the tickets, at a ticket checking step 52. It will complete the disk operation only if all the tickets are still valid in memory 38. A ticket will have been invalidated if in the time since the issuance of the ticket at step 41, another client has successfully performed a SCD operation on an overlapping byte range in the object in question, or possibly for other reasons, such as a memory shortage or failure. If the SCD operation fails, the whole operation is typically restarted, at step 40.

As will be seen in detailed descriptions of actual file system operations described below, a typical operation may comprise multiple LLD and SCD operations. Typically, for one of the SCD operations, when OBSD 24 validates the ticket, the current file system operation is deemed to have reached a no-return stage, at a no-return step 54. Once the file system operation has passed this stage, it must be completed, either by the client that initiated it or by another client (based on the pool data, as described below). The client therefore finishes writing the modified data to the OBSD, at a self-completion step 56. At this point, the pool data referring to this operation is canceled from storage 36. The file metadata is also updated to reflect the change, at a metadata update step 58. This update mechanism is described in greater detail hereinbelow.

Returning now to step 42, the data stored on OBSD 24 may indicate to client 26 that the requested object is already being operated upon by another client. In this case, client 26 checks the metadata or entry for this object to determine whether the other client's operation has already passed the no-return stage, at a no-return checking step 60. If not, client 26 is free to interfere with the other client's operation, by generating its own data at step 46 and proceeding to submit its SCD request at step 50. Whichever client submits its SCD first will succeed in making its modification to the object in question, assuming the client's tickets are still valid at that point.

On the other hand, if at step 60, client 26 determines that another client's operation has passed the no-return stage, it must not interfere. At this point, client 26 may help to complete the other client's operation. This helping function ensures that all operations that have passed the no-return stage are completed, so that consistency is maintained and blocking of objects is avoided, even when the original, initiating client has failed. Optionally, before proceeding to help complete another client's operation, client 26 may choose to hold off for a certain period, in order to enable the initiating client (or another client) to complete the operation itself. In any case, once client 26 has decided to help complete an operation initiated by another client, it reads the relevant pool data from OBSD 24 to determine the steps that must be carried out, at a pool reading step 62. It then completes the operation, at a helping completion step 64, including canceling the pool data and updating the metadata, as at steps 56 and 58. The client can then return to step 40 to resume its own, original operation.

B. Data Structures

Figure 3:
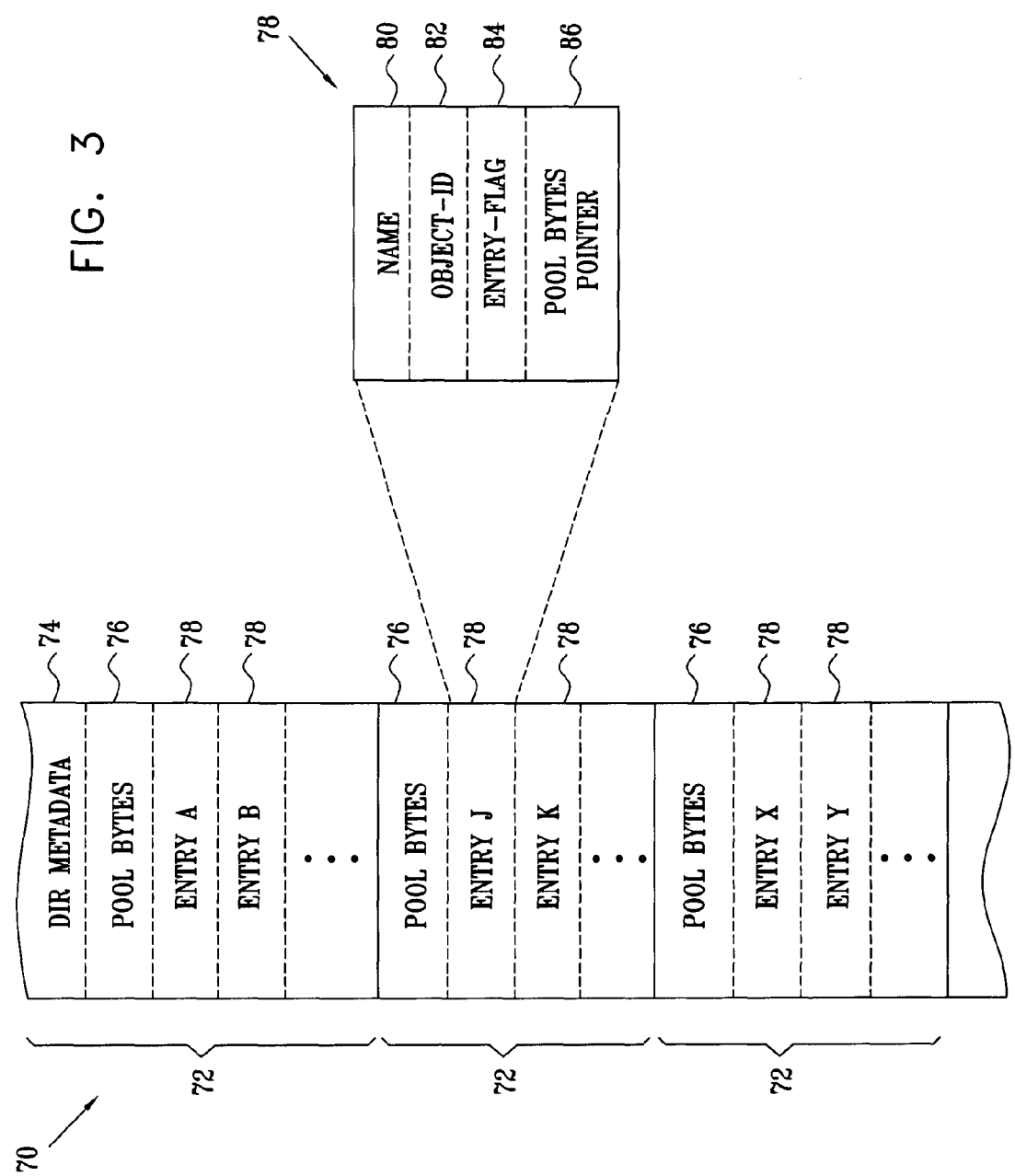
FIG. 3 is a block diagram that schematically shows a data structure used to hold directory information, in accordance with a preferred embodiment of the present invention.

FIG. 3 is a block diagram that schematically illustrates a directory 70 used by LFFS 34, in accordance with a preferred embodiment of the present invention. This data structure is maintained as an object within one of OBSDs 24, and is managed by the LFFS without direct involvement of the OBSD. In other words, the OBSD itself is organized in terms of objects, and need have no knowledge of how the directory structure is represented or maintained by the LFFS.

The data structure of directory 70 is logically divided into numbered virtual blocks (referred to as "vBlocks") 72, whose size is defined by the user. Typically, the size of a vBlock is less than or equal to the size of a physical block on OBSD 24. Each vBlock 72 comprises entries 78 referring to files and subdirectories, as well as pool bytes 76. The pool bytes include one cell (for each entry in the vBlock for which a file system operation is in progress. Each cell is of sufficient size to hold the required completion information, as described above. Each entry 78 includes a name 80 of the respective file or subdirectory in LFFS 34, which it binds with an object in OBSD 24, represented by its object_id 82 (identifying the OBSD and the object in the OBSD in which the file or subdirectory is actually held). Entry 78 also includes a pointer 86 to a cell in pool bytes 76 that is used to hold completion information for this object, as well as a status flag 84, which is used to publish information regarding operations in progress on this object. Preferably, flag 84 may have any of the values listed below in Table II:

TABLE II

ENTRY FLAGS

Name - null flag, indicating no operation on this object is currently in progress.
InCreateDir - directory in creation.
InCreateFile - file in creation.
InDeleteDir - directory being deleted.
InDeleteFile - file being deleted.
InDeleteSuccessDir - directory deletion has passed the no-return stage.

TABLE II-continued

ENTRY FLAGS

InDeleteSuccessFile - file deletion has passed the no-return stage.
InRenameFrom, InRenameTo - file/directory being renamed. (See description of renaming below.)
InRenameFromSuccess, InRenameToSuccess - file/directory renaming has passed the no-return stage.
InLink - file is being hard-linked.
InLinkSuccess - hard link has passed the no-return stage.
InUnlink - file link is being deleted.
InUnlinkSuccess - link deletion has passed the no-return stage.

In addition to pool bytes 76 and entries 78, the beginning of the first vBlock 72 in directory 70 contains directory metadata 74, i.e., directory attributes. These attributes preferably include a map of vBlocks 72 belonging to this directory, as well as a directory flag indicating operations that may be in progress with respect to this directory, such as BeingDeleted, BeingEnlarged or BeingShrunk. When there is no such operation in progress, the directory flag has a null value. Typically, directory metadata 74 also include standard attributes, such as mode, type, uid, gid, size, aTime, cTime and mTime, as are known in the art of operating systems, such as UNIX™.

Typically, when a directory is initially created, it includes only a single vBlock 72, which is used to hold all its entries 78. The directory then grows and shrinks in response to the number of entries it must hold. Preferably, an extendible hashing scheme is used for enlarging and shrinking the directory. Such schemes are known in the art, as described, for example, by Fagin in "Extendible Hashing—a Fast Access Mechanism for Dynamic Files," *ACM Transactions on Database Systems* 4 (1979), pages 315–344, which is incorporated herein by reference. For this purpose, each vBlock 72 includes several split-level bits, indicating its place in the hashing hierarchy. The distribution of entries 78 over multiple vBlocks 72 is preferably determined by hashing name 80 of each entry to an integer value, typically thirty-two bits long. The hash value and the vBlock map maintained in metadata 74 determine the placement of each entry 78 in directory 70. A root directory is maintained by LFFS 34 in a fixed, known location, where it can be accessed by clients 26 to find the subdirectories they require.

Figure 4:
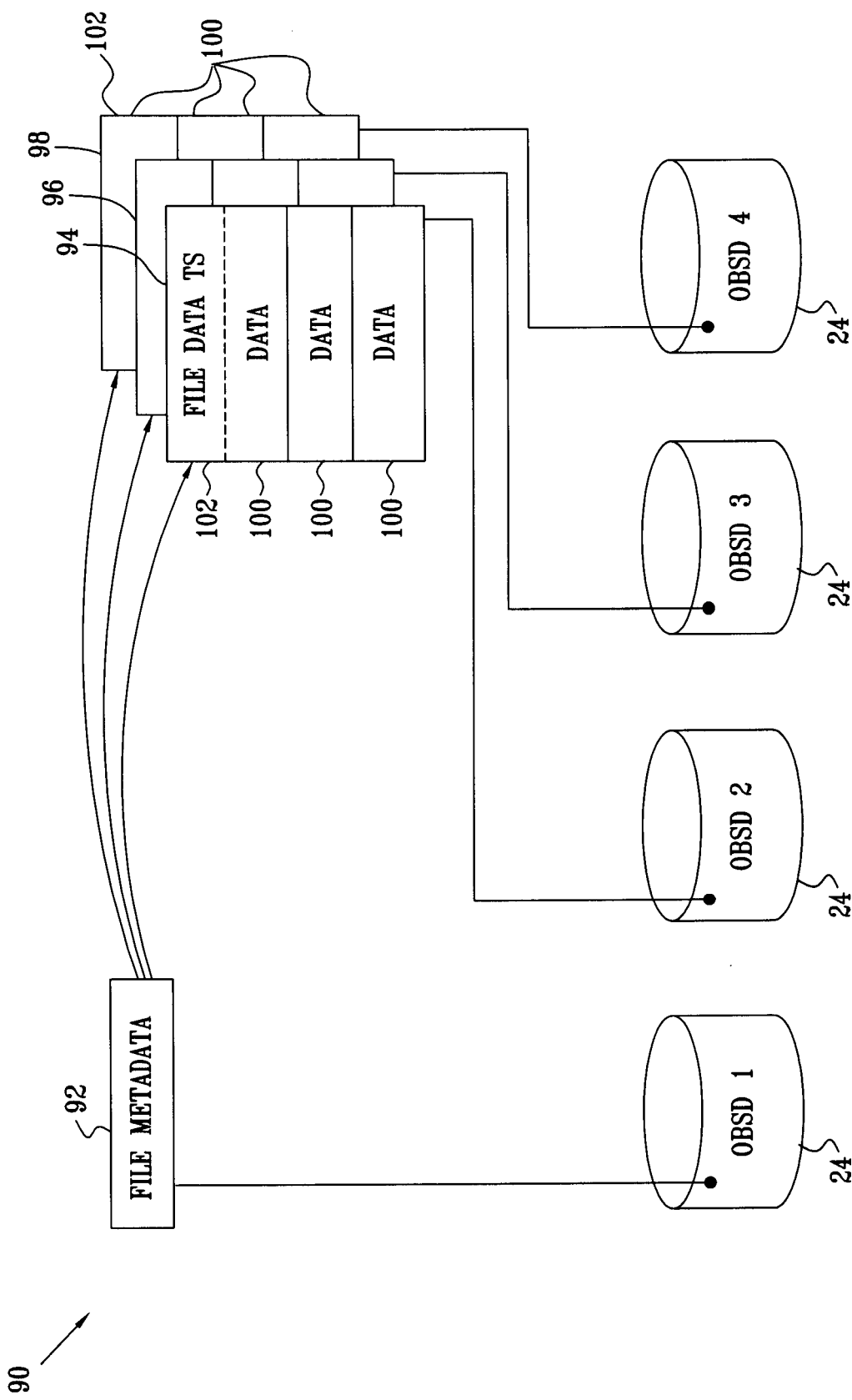
FIG. 4 is a block diagram that schematically shows a data structure used to store a file, in accordance with a preferred embodiment of the present invention.

FIG. 4 is a block diagram that schematically illustrates a file 90 maintained by LFFS 34, in accordance with a preferred embodiment of the present invention. The file is represented by one metadata object 92, along with one or more data objects 94, 96, 98, . . . . These objects may reside on a common OBSD 24, or they may be spread over multiple OBSDs, as shown in the figure. In this way, a file may even be larger than an entire OBSD. Each object contains file data 100, which are distributed among the objects according to a predetermined method and granularity (typically in chunks of several vBlocks).

Various methods may be used to create file 90 and distribute data 100. Typically, metadata object 92 is created first, followed by creation of the first data object 94 when data are first written to file 90. Alternatively, object 92 may itself contain data, as well. Preferably, in order to enable file 90 to grow beyond the space limitations of a single disk, objects 92 and 94 are on different OBSDs. When object 94 becomes full (either because it has filled up its OBSD, or because it has reached some other predetermined size limit), object 96 is created on another OBSD to contain the overflow. In this way, object 94 contains data 100 from the beginning of file 90 up to the offset at which the data were split to object 96. Object 96 will contain the rest of the data, up to the point at which it becomes necessary to split the file again to object 98. Alternatively, other distribution schemes may be used for partitioning file data 100 among objects on OBSDs 24.

Every file metadata object 92 and data object 94 contains a timestamp 102. This timestamp is used to keep track of changes in the file size and layout, and does not have any necessary connection to real time. Rather, LFFS 34 increments timestamp 102 of file 90 when it performs an operation that decreases the file size (such as truncation) or changes the file layout. Client operations that are executed concurrently and depend on the file size or layout (such as write) use the timestamp to detect such changes. When the client detects a timestamp mismatch, the client must stop the operation and reload the file metadata before proceeding, in order to ensure that it performs its operation on the proper, valid byte range on the OBSD.

Table III below lists the preferred contents of file metadata object 92:

TABLE III

FILE METADATA file_ts - File timestamp.
file_flag - A flag indicating the status of operations on the file. Preferably, this flag can take any of the following values: Null (no operation in progress), BeingTruncated, BeingDeleted, BeingLinked, BeingUnlinked, BeingSplit.
map - A tree of the data objects of the file.
dist_method - Data distribution system used for partitioning file data among objects on OBSDs.
standard attributes - for example, nlink, mode, type, uid, gid, size, aTime, cTime, mTime, as noted above.

Data timestamp 102, identified hereinbelow as data_ts, typically contains a copy of file_ts. When certain file system operations are in progress (such as truncation, described below with reference to FIG. 7), however, these values may be different, thus indicating to clients 26 the status of the operation.

C. LFFS Operations

LFFS operations are divided into the following five classes, depending on the objects involved, the synchronization needed, and the internal functionality of the operations:

1. Non-interfering—Operations that involve only one existing object, such as mkdir and create.
2. Interfering—Operations that involve coordination between two existing objects, which may be on different OBSDs, such as rename, rmdir, remove, link, and unlink.
3. Common—Operations on files that involve data objects in the files, such as truncate, write, and read.
4. No-sync—Operations that do not require synchronization, such as lookup and readdir.
5. Internal—Operations that are called by other operations as subroutines, including:
   enlargeDir—takes care of enlarging a directory if it is full.
   shrinkDir—takes care of shrinking the directory if it becomes sparse.
   split—splitting a file data object if there is no more space in the OBSD or if the current data object has reached a predetermined limit.

All these operations cause a change in the time attributes of the file, such as aTime, cTime and mTime, as mentioned above. Updates to these attributes are issued periodically by an internal mechanism of the file system. Each client holds a queue containing buffered updates. Periodically, these updates are sent to be stored on the appropriate OBSDs.

Selected operations in the first three classes (non-interfering, interfering and common) are described below in detail, to exemplify the techniques used in implementing LFFS 34. Extension of these techniques to other file system operations will be apparent to those skilled in the art. No-sync operations are performed by LFFS 34 in a manner similar to shared file systems known in the art. Implementation of the internal operations is described above with reference to FIGS. 3 and 4. As noted there, the enlargeDir and shrinkDir operations are preferably based on principles of extendible hashing.

To aid in understanding the principles of the present invention, the first three selected operations (directory creation, writing and truncation) are shown in both flow charts and pseudocode. Because of the greater complexity of the last operation (renaming a file), it is shown only in pseudocode. To simplify the pseudocode below, the following conventions and notations are used:

t, b (as well as t1, b1, etc.) refer to a ticket and a byte range of data returned by a LLD operation.

success is the Boolean value returned by SCD operations. If a SCD operation fails, the whole disk operation is restarted unless stated otherwise.

metadata_offset, metadata_size—indicate the first byte and the number of bytes of the metadata of a file or directory.

entry_block_offset, entry_block_size—indicate the block offset of a vBlock in a file or directory and the size of the vBlock.

data_ts_offset, data_ts_size—indicate the position and the number of bytes of data timestamp 102, referred to as data_ts.

To differentiate between LFFS operations and OBSD operations, standard OBSD operations are denoted as OperationD (for example, CreateD).

Figure 5:
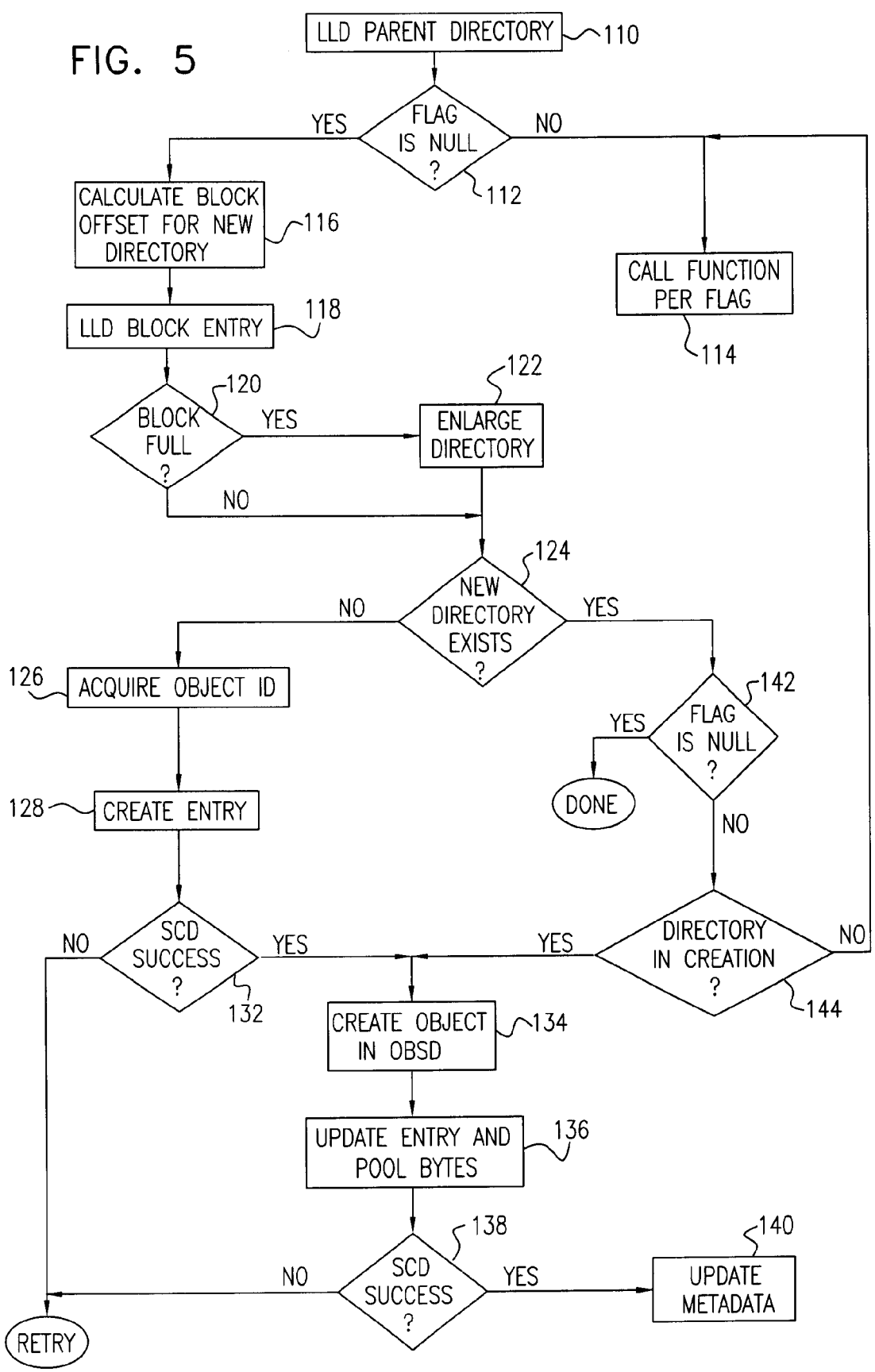
FIG. 5 is a flow chart that schematically illustrates a method for creating a directory on an OBSD, in accordance with a preferred embodiment of the present invention.

FIG. 5 is a block diagram that schematically illustrates a method for creating directory 70, in accordance with a preferred embodiment of the present invention, as an example of a non-interfering operation. This method is invoked by the file system command mkdir(pathname). Client 26 looks up the pathname to find the parent directory (referred to as parent). The new directory (new) may be on the same OBSD as the parent, or on a different OBSD. The client then performs a LLD operation, at a directory LLD step 110, to read metadata 74 of the parent directory. The client checks the directory status flag, at a flag inspection step 112. If the flag has a value other than Null, it means that another client is currently operating on this directory. Depending on the flag value (other than Null), the client calls an appropriate function, at a function call step 114. Typically, the function involves either interfering with the directory operation in progress, helping to complete the operation, or waiting for the operation to complete, as described above.

Client 26 reads the directory metadata to determine directory vBlock 72 in which new should be created, and determines the location at which entry 78 for new will be written, following the preceding entries in the vBlock, at an offset calculation step 116. The calculation is based on the hashing function described above. Before it can write entry 78 to the designated block, the client initiates another LLD operation, at a block LLD step 118, to read the contents of the byte range to which the entry is to be written. The client checks to determine whether this byte range is already full, at a block checking step 120. If so, the client enlarges the directory, at a directory enlargement step 122, using the enlargeDir function described above.

Client 26 may also discover that there is already an existing directory named pathname/new, at an existing directory discovery step 124. Handling of this case is described below. As long as new does not exist, client 26 selects an OBSD 24 to hold the directory object that it is going to create, and acquires object_id 82 for the object, at an ID acquisition step 126. Preferably, OBSD 24 contains an object holding object ID values. To acquire object_id 82, the client initiates a LLD operation on this object to read the current ID value, increments the ID to its next value, and then attempts to perform a SCD operation to write this new value to the OBSD. If the SCD operation is successful, the client can proceed to use the new object ID value. Client 26 then completes the details of entry 78 for new, at an entry creation step 128, setting name 80 to be new, object_id to the new ID value, and entry_flag 84 to InCreateDir. Pointer 86 is set to point to a cell in pool bytes 76, to which the client writes information specifying creation of directory new, including the details of entry 78.

Having prepared the necessary modifications to directory entry 78 in the parent directory and to block 72 in which the new directory is to be created, client 26 initiates a SCD operation to write the entry to parent, at a parent SCD step 132. For this purpose, the client submits the tickets it received at LLD steps 110 and 118 above. As noted above, if the SCD fails (because one of the tickets is invalid), client 26 must typically retry the mkdir operation from the beginning. If the SCD succeeds, however, it means that the creation of new has reached the no-return stage. In this case, the requested new object with the attributes indicated by entry 78 is created, at an object creation step 134.

Once creation is complete, client 26 changes entry_flag 84 of new to Name, and sets pointer 86 to null, at an entry updating step 136. To store the new entry data, client 26 initiates another SCD operation, at an entry SCD step 138. When this operation is successful, the client considers all the actions connected with the mkdir operation to be done. The client queues a request to update directory metadata 74 of parent accordingly, at a metadata update step 140, indicating the changes in the attributes of parent directory 70.

As noted above, client 26 may discover at step 124 that the new directory it is attempting to create already exists. If so, the client checks entry_flag 84 of new, at an entry flag checking step 142. If the flag is set to Name, there is no further work to be done in creating this directory, and the client abandons its mkdir request. If the flag is not null, the client ascertains whether the flag indicates that creation of the new directory is in progress, at a creation flag checking step 144. If there is some operation in progress other than creation of the directory, client 26 calls the appropriate function to deal with this operation, as described above with reference to step 114.

If the InCreateDir flag is set in entry 78 for new, client 26 may attempt to help in creating the new directory, which was evidently initiated by another client (or may have been initiated earlier by the same client but not completed). In this case, client 26 reads the appropriate pool bytes 76, and based on the information they contain, continues the process of directory creation through steps 134 to 140. It may have happened, for example, that the client that initiated creation of the directory and brought it through step 132 then "went to sleep" for several minutes, leaving another client to complete the operation. In this case, when the original client wakes up and attempts to finish its job, it will encounter a SCD failure at step 138. The original client will then retry the entire process from the beginning. When it reaches step 124, it will determine that the new directory already exists, and will find, at step 142, that the entry_flag of the directory is Name. The client will thus be satisfied that the directory has been created successfully and will proceed to its subsequent operations.

TABLE IV

Figure 6:
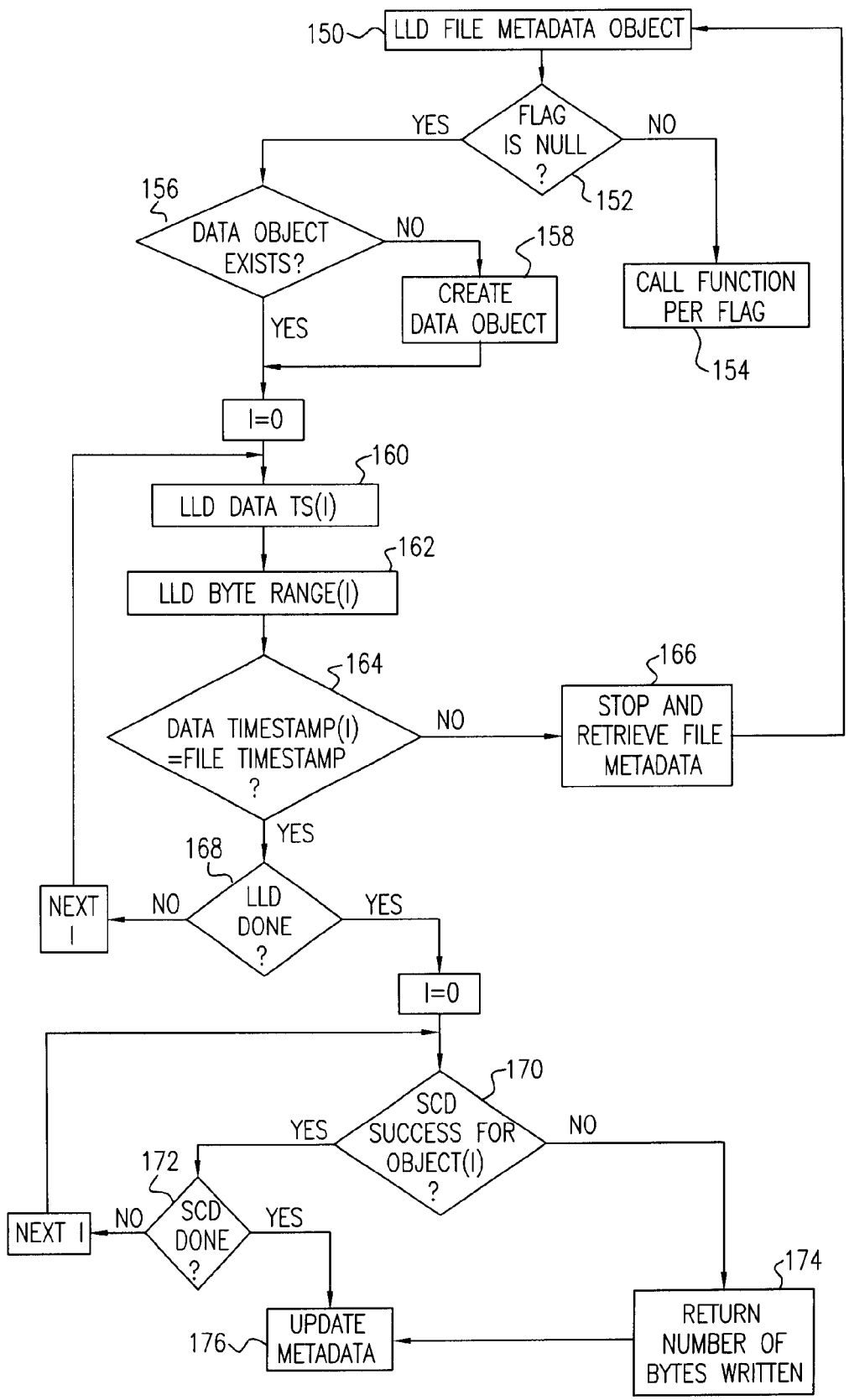
FIG. 6 is a flow chart that schematically illustrates a method for writing data to an object on an OBSD, in accordance with a preferred embodiment of the present invention.

DIRECTORY CREATION 1. t,b = LLD(parent_oid, metadata_offset, metadata_size).
2. If (b.dir_flag <> Name) then call the appropriate function according to the flag.
3. Calculate the offset of the block entry where new should be placed.
4. t1,b1 = LLD(parent_oid, entry_block_offset, entry_block_size).
5. If b1 is full then call enlargeDir.
6. If new exists then:
   if (b1.entry_flag = InCreateDir) then read PoolBytes[ptr] and go to stage 9 to help complete the operation.
   if (b1.entry_flag <> Name) then call the appropriate function according to the flag.
   if (b1.entry_flag == Name) then new already exists.
7. If new does not exist then update b1 with the following:
   Decide in which OBSD to create the object, and acquire an object_id
   Create an entry for new: name = new, object_id = (new_OBSD, new_oid), entry_flag = InCreateDir, ptr = i.
   PoolBytes [i] = Creation of new with all the above details.
8. success = SCD(parent_oid, [t, t1], entry_block_offset, b1) - No-return stage.
9. CreateD (new_oid) - Create new object in new_OBSD with initial attributes.
10. Update b1 with the following:
    Modify new entry with: {name = new, object_id = (new_OBSD, new_oid), entry_flag = Name, ptr = null.
    PoolBytes[i] = Null.
11. success = SCD(parent_oid, [t, t1], entry_block_offset, b1).
12. Enqueue a time update request for parent_oid metadata FIG. 6 is a flow chart that schematically illustrates a method used by client 26 for writing to a specified object, in accordance with a preferred embodiment of the present invention. Because this is one of the common operations, it does not have a no-return stage. The method carries out a function of the form write(object_id, offset, count, data), whereby the client attempts to write count bytes of the data to a location starting at offset in a certain file, as specified by object_id. For clarity of explanation, the method is described here with reference to file 90 and data object 94 (FIG. 4).

The client starts by looking up object_id 82 of file 90 in its directory entry 78. It then initiates a LLD operation to read file metadata 92 from the specified object, at a file metadata LLD step 150. The file metadata include the file timestamp, as well as other fields listed in Table III above. The client checks the file status flag, at a flag inspection step 152. If the flag has a value other than Null, it means that another client is currently operating on this file. Possible values of the flag are also listed in Table III. Depending on the flag value (other than Null), the client calls an appropriate function, at a function call step 154. These steps are similar to steps 112 and 114 described above, although FIG.

5 refers to directory flags and functions, whereas here the functions in question are associated with entries.

Client 26 next checks to determine whether file 90 contains any data objects, at an existence checking step 156. (A file when initially created may contain only metadata.) If there is no data object, the client calls the split function described above in order to create object 94, at an object creation step 158.

Depending on the range of data to be written (count), more than one data object 94, 96, . . . , may be affected by the write operation. For each of the data objects (identified in FIG. 6 by an index I), the client initiates two LLD operations: The first LLD reads out data timestamp 102 of the data object, at a timestamp LLD step 160. The second LLD reads out the range of data bytes affected by the write operation, at a data LLD step 162. With each of these LLD operations, the OBSD that contains the data object issues a ticket, as described above. The tickets issued at step 160 refer to the data timestamp, and will thus indicate subsequently whether file metadata 92 changed in the course of carrying out the write operation. The tickets issued at step 162 refer to each specific byte range, and will thus indicate whether another client has written to the byte range before the current write operation was completed. Both tickets are necessary, the first in order to ensure that the client does not write data to a byte range that no longer belongs to the file (due to truncation, for example), and the second to prevent concurrent writes to the same byte range, so as to maintain atomicity of operations.

For each data object 94, 96, . . . , client 26 checks the data timestamp it has read out at step 160 against the file timestamp it received at step 150, at a timestamp comparison step 164. As noted above, the data timestamp should generally be equal to the file timestamp. If the values are not equal, it means that another operation is in progress (for example, a truncation operation, as described below). In this case, the write process stops, and the client goes back to retrieve file metadata 92, at a metadata retrieval step 166. Otherwise, the process continues until the LLD operation on all the affected data objects has been completed, at a LLD completion step 168.

Client 26 reads and modifies the data in the byte ranges that it received at step 162, and prepares to write the modified data back to data objects 94, 96, . . . . The client then initiates a SCD operation for each of the data objects, at an object SCD step 170. The order of SCD operations on the objects preferably follows the order of the data distribution system that is used, as indicated by the dist_method field in the file metadata (Table III) and described above. For each data object, the client submits both of the tickets it received, at steps 160 and 162. As explained above, if either of the tickets is invalid, the write operation must fail. As long as the SCD operations are successful, however, client 26 continues to cycle through the participating data objects, until all of the data have been written, at a SCD completion step 172.

For each SCD operation that succeeds at step 170, a count is kept of the number of bytes that were successfully written to the OBSD. In the event that step 170 fails after having successfully written to one or more of objects 94, 96, . . . , a message is preferably returned to client 26 giving the total number of bytes of data that were written, at a data size return step 174. In either case, after data have been written to one or more of the objects in file 90, the client submits a request to update metadata 92, at a metadata update step 176. The request indicates the attributes of the file that have changed, including the file size if applicable.

Table V below is a pseudocode listing for the function write(object_id, offset, count, data), corresponding to the method of FIG. 6. The listing uses the conventions and notations listed above. The file to which data are to be written is called fent, and the timestamp of data object i is referred to as data_ts[i].

TABLE V

WRITE TO FILE

| 1. | t,b = LLD(fent_oid, metadeta_offset, metadata_size) |
| 2. | If (file_flag <> Null) then call the appropriate function. |
| 3. | If there is no data object, then call split to create one. |
| 4. | For each data object that participates in the write do:<br>t1[i], data_ts[i] = LLD(data_object_oid, data_ts_offset, data_ts_size)<br>t2[i], b2[i] = LLD(data_object_oid, byte_range_offset, byte_range_size)<br>If data_ts[i] <> file_ts then: stop operation and retrieve file metadata. |
| 5. | For each data object that participates in the write do:<br>success := SCD((data_object_oid, [ti[i], t2[i]], byte_range_offset, data)<br>If success == true then sum = sum + size of written data<br>Else: return − sum bytes were written. |
| 6. | Enqueue a time update request for fent_oid metadata. |

Figure 7:
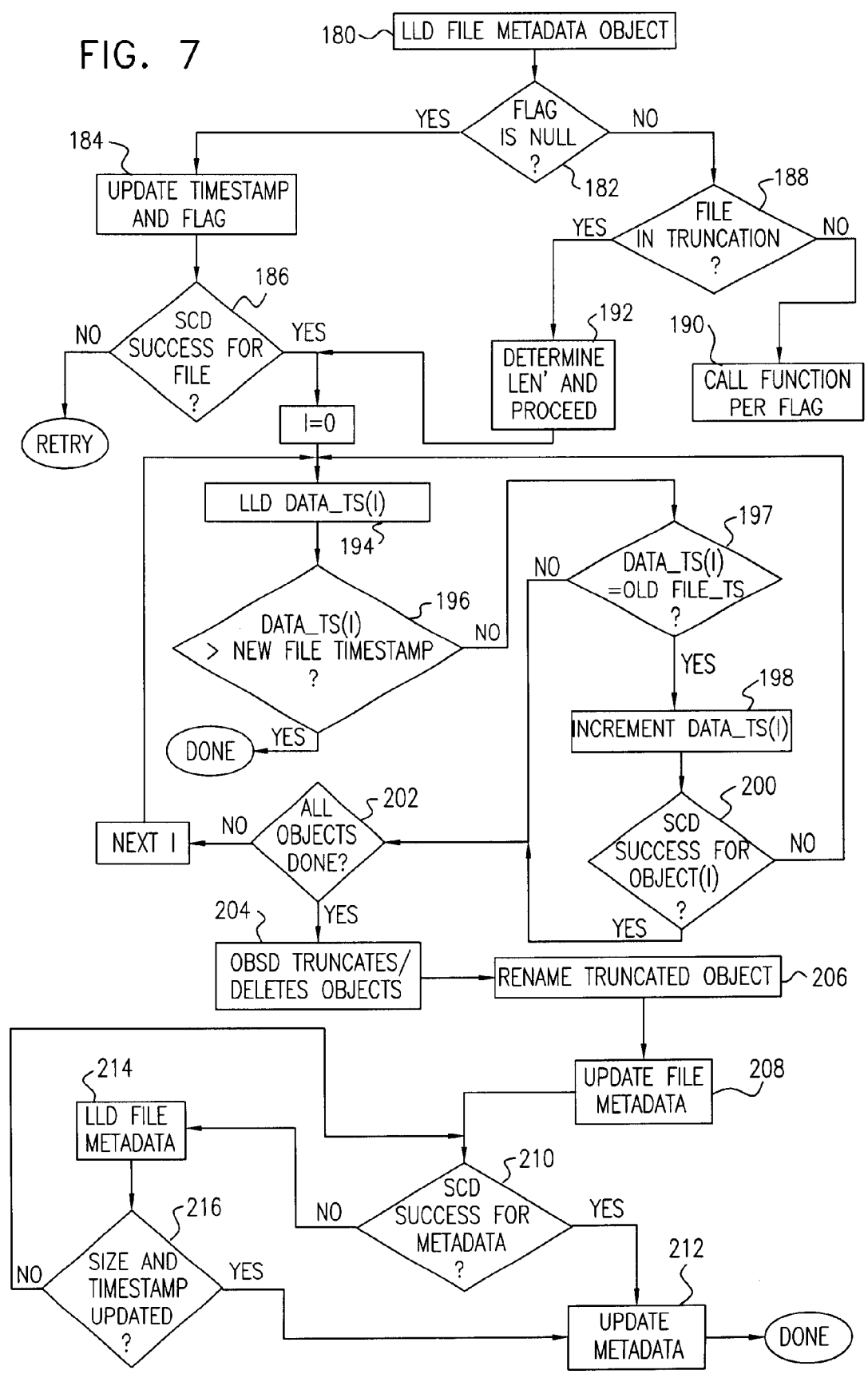
FIG. 7 is a flow chart that schematically illustrates a method for truncating an object on an OBSD, in accordance with a preferred embodiment of the present invention.

FIG. 7 is a flow chart that schematically illustrates a method for truncating file 90 to a specified length, in accordance with a preferred embodiment of the present invention. This is also one of the common operations, but is more complex than the write operation described above. As in the previous method, client 26 begins with an LLD operation to retrieve file metadata 92, at a metadata LLD step 180. The metadata includes the file flag, which the client examines, at a flag checking step 182. So long as the flag value is Null, the truncation operation can proceed freely.

When the flag is Null, the client next attempts to modify the file metadata to reflect the operation in progress, at a metadata writing step 184. The client increments the file timestamp and sets the file flag to a value BeingTruncated (len), indicating the length to which the file will be truncated. The client then invokes a SCD operation, in order to record the changes in metadata 92 in file 90 to the appropriate OBSD, at a file SCD step 186. The success of this operation depends on the validity of the ticket issued at step 180. If the SCD operation is successful, the truncation operation is considered to have reached the no-return stage.

If the file flag is found at step 182 to be non-Null, the client checks the value of the flag to determine whether it indicates that a truncation operation has been started by another client, at a concurrent truncation checking step 188. If the flag has some non-Null value other than BeingTruncated, the client preferably calls an appropriate function to deal with the particular value, at a function calling step 190, as described above. On the other hand, if the flag is set to BeingTruncated, client 26 may be able to help with a truncation started by another client, which has now passed the no-return stage. For this purpose, client 26 reads the len field of the flag, in order to find the length len' to which the other client had ordered the file to be truncated, at a length determination step 192. Client 26 can then continue the truncation accordingly.

To proceed with the file truncation, it is necessary to update data timestamps 102 of all data objects 94, 96, . . . , in file 90, in order to prevent concurrent operations from writing to the truncated range. For this purpose, client 26 initiates a LLD operation to read the data timestamp of each data object(I) in file 90, at a data timestamp LLD step 194. As in the case of the write operation described above, the order of operations preferably follows the order of the data distribution system. Normally, the data timestamps will be equal to the old file timestamp in metadata 92. If additional operations have been performed on a data object since the client read the file metadata, however, the data timestamp may be greater than the old file timestamp, but it will never be less.

Client 26 checks each of the data timestamps in turn, at a timestamp completion checking step 196, to determine whether it is greater than the new file timestamp generated at step 184. If the data timestamp is greater than the new file timestamp, it means the truncation operation has already been completed, and client 26 is done. If not, the client checks whether the data timestamp for object(I) is equal to the old file timestamp, at a timestamp equality checking step 197. If so, the client attempts to increment the data timestamp, at a timestamp incrementation step 198. It then invokes a SCD operation to record the new data timestamp value in object(I), at a timestamp SCD step 200. The SCD operation uses the ticket issued for object(I) at LLD step 194. If the operation is unsuccessful, the LLD operation at step 194 must be repeated to get a data timestamp value with a new ticket. The process of steps 194 through 200 continues until all the data objects in the file have been examined and, if necessary, updated, at an update completion step 202.

Once all the timestamps have been checked and, if necessary, updated, the affected OBSDs truncate or delete data objects 94, 96, . . . , as required in order to reduce file 90 to the specified length, at an object truncation step 204. For example, assume the file comprises five data objects, each containing 10 MB, for a total size of 50 MB, and suppose that the client asks to truncate the file to 32 MB. In this case, the fifth object will be deleted from the file, and the fourth object will be truncated to 2 MB. The first three data objects are unchanged, except for their data timestamps. After the file has been truncated, any OBSD holding a data object that has been truncated is instructed to rename the truncated object, i.e., to assign the data object a new object_id, at a renaming step 206. The purpose of renaming the object is to prevent a slow client from truncating it again after the operation has already been completed.

Once truncation is complete, client 26 must modify the file metadata, at a metadata update step 208. The file flag should now be changed to Null, and the file size should be set to len. To record the change in metadata 92, the client invokes a SCD operation, at a metadata SCD step 210, again using the ticket it received at step 180. If the ticket is still valid, the truncation operation is finished, and the client queues a request to update the file metadata time attributes, at a final metadata update step 212.

If the SCD at step 210 is unsuccessful, the client initiates a new LLD operation to read the current file metadata, at a LLD repeat step 214. It then checks the file size and timestamp values in metadata 92 against the modified values determined at step 208, at a metadata checking step 216. If the values in metadata 92 have not been updated to accord with the modified values determined at step 208, the client repeats the SCD operation at step 210. Otherwise, the client determines that the truncation is completed (possibly having been helped along by another client).

Table VI below is a pseudocode listing for the function truncate(object_id, length), corresponding to the method of FIG. 7.

TABLE VI

TRUNCATE A FILE 1. t,b = LLD (fent_oid, metadeta_offset, metadata_count)
2. If (file_flag == BeingTruncated (len')) then continue the operation with len'.
3. If (file_flag <> Null) then call the appropriate function.
4. Update b with the following:
   new_file_ts = file_ts +1
   file metadata with: {file_flag = BeingTruncated(len), file_ts = new_file_ts}
5. success := SCD(fent_oid, [t], metadeta_offset, b) – No-return stage.
6. For each data object do:
   a) t[i], b[i] = LLD(data_object_oid, data_ts_offset, data_ts_count)
   b) b[i] can only be equal or larger than file_ts.
   If (b[i] > new_file_ts) then the operation was completed.
   if (b[i] == file_ts) then
   (i) b[i] = b[i]+1
   (ii) success := SCD(data_object_oid, [t[i]], data_ts_offset, b[i]).
   (iii) If (not success) then go to 6(a).
7. TruncateD and DeleteD data objects as needed.
8. RenameD(truncated_oid, new_oid) – Get new_oid from the same OBSD and generate the rename operation with it.
9. Update b with the following:
   file metadata with: {file_flag = Null, size = len, map including new_oid}
10. success := SCD(fent_oid, [t], metadeta_offset, b).
11. If (not success) then
    t,b = LLD(fent_oid, metadata_offset, metadata_size)
    If the size and file_ts have not been updated then goto 10.
12. Enqueue a time update request for fent_oid metadata.

Table VII below is a pseudocode listing of the function rename(old, new), in accordance with a preferred embodiment of the present invention, as an example of one of the interfering operations. The rename function operates on both files and directories, associating a new name (new) with an object pointed to by old. If new does not exist, it is created. For the sake of simplicity, if new does exist, the operation fails. (This feature differs from some standard file systems, in which if new exists, it is removed, and old is renamed to new, as long as both old and new are of the same type.) Upon successful completion of the renaming operation, a directory entry should exist for new, while the previous entry for old should no longer exist.

TABLE VII

RENAMING A FILE OR DIRECTORY 1. t,b = LLD(old_parent_oid, metadata_offset, metadata_size).
2. If (b.dir_flag <> Null) then call the appropriate function or try to interfere with the operation in progress.
3. Calculate the offset of the block entry where old should be.
4. t1,b1 = LLD(old_parent_oid, old_entry_block_offset, entry_block_size).
5. If old does not exist in b1, then abort.
6. If (b1.entry_flag <> Null) then call the appropriate function according to the flag.
7. Update b1 with the following:
   old entry with: {name = old, object_id = (OBSD, oid), entry_flag = InRenameFrom, ptr = i}.
   PoolBytes[i] = InRenameFrom with new information.
8. success := SCD(old_parent_oid, [t, t1], old_entry_block_offset, b1).

TABLE VII-continued

RENAMING A FILE OR DIRECTORY 9. t2,b2 = LLD(new_parent_oid, metadata_offset, metadata_size).
10. If (b2.dir_flag <> Null) then call the appropriate function or try to interfere with the operation in progress.
11. Calculate the offset of the block entry where new should be placed.
12. t3,b3 = LLD(new_parent_oid, new_entry_block_offset, entry_block_size).
13. If new exists then abort the operation.
14. Update b3 with the following:
    new entry with: {name = new, object_id = (OBSD, oid), entry_flag = InRenameTo, ptr = i}.
    PoolBytes[i] = InRenameTo with old information.
15. success := SCD(new_parent_oid, [t2, t3], new_entry_block_offset, b3)
16. Update b1 with the following:
    old entry with: {name = old, object_id = (OBSD, oid), entry_flag = InRenameFromSuccess, ptr = i}.
    PoolBytes[i] = InRenameFromSuccess with new information.
17. success := SCD(old_parent_oid, [t,t1], old_entry_block_offset, b1) – No-return stage.
18. Update b3 with the following:
    new entry with: {name = new, object_id = (OBSD, oid), entry_flag = InRenameToSuccess, ptr =i}.
    PoolBytes[i] = InRenameToSuccess with new information.
19. success := SCD(new_parent_oid, [t2, t3], new_entry_block_offset, b3).
20. Update b1 with the following:
    Remove old entry.
    PoolBytes[i] = Null.
21. success := SCD(old_parent_oid, [t,t1], old_entry_block_offset, b1)
22. Update b3 with the following:
    new entry with: {name = new, object_id = (OBSD, oid), entry_flag = Name, ptr = Null}.
    PoolBytes[i] = Null.
23. success := SCD(new_parent_oid, [t2,t3], new_entry_block_offset, b3)
24. Enqueue a time update request for old_parent_oid and new_parent_oid metadata.

As shown in the table above, to rename a file or directory, a client marks old (the current name) with the flag InRenameFrom (step 7). Afterwards, the client checks whether the new name already exists in the directory in which it is supposed to be created (step 13). If new already exists, the operation is stopped. Otherwise, the new entry is created, with entry_flag InRenameTo. The rename operation succeeds only when the client has successfully completed the SCD operation at step 17, after modifying the directory entry under the old object name so that its entry_flag is InRenameFromSuccess. This is the no-return stage in the process. As noted above, only the client that initiates the renaming may perform the method of Table VII up through the no-return stage. Any client that observes the operation after the no-return stage must help to complete it.

On the other hand, before the renaming operation reaches the no-return stage, other clients may interfere with it by initiating a SCD operation that returns old to its normal status and by removing the directory entry for new. Since renaming can be rolled-forward or rolled-backward, it requires that all participating clients agree on the direction of the operation—forward or backward.

At any stage of the renaming operation, any client that reads the new or old entries, with their respective flags, can determine which step to take. For example:

When a client encounters old with entry_flag InRenameFrom (meaning that the initiating client successfully performed step 8), it can interfere with the renaming operation by initiating a SCD operation on old with the directory entry_flag set to Name (null). If this SCD operation is successful, the intervening client can then continue the operation that it originally sought to perform on old, and which led it to encounter the renaming in process. In this case, the renaming operation will fail, and the initiator will have to restart it.

When the client encounters new with entry_flag= InRenameTo (after the initiator successfully performed step 15), it should check the entry_flag of old. If the flag is set to InRenameFrom, then the client should initiate a SCD operation on old with the flag set to Name. If the flag is set to Name, this step is unnecessary, since it means that another client has already interfered with the renaming operation. If this SCD operation is successful, the intervening client can remove the new entry. If the client is successful in both the SCD and entry removal operations, it can then continue its own operation. The renaming operation will fail, and the initiator will have to restart it.

If, however, the old entry_flag is set to InRenameFromSuccess, it means that the renaming process has passed the no-return stage (step 17). In this case, all clients must help the rename operation to be completed.

Although the preferred embodiments described above relate to certain types of file system operations and conventions, those skilled in the art will be easily capable of extending the principles of these embodiments to other file system types and operations. Furthermore, although OBSDs 24 provide a convenient platform for implementing the present invention, the principles of the present invention may also be applied, mutatis mutandis, using network-attached storage devices of other types. For example, devices that use conventional block-based interfaces may also be adapted to provide the LLD and SCD operations described above, and thus can support lock-free shared storage in conjunction with a suitable file system.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for storage of information, comprising:
   coupling a plurality of clients to communicate with a storage device via a network;
   reading out data from a selected location on the storage device to a memory of one of the clients;
   modifying the data in the memory;
   determining whether the modified data can be written back to the selected location on the storage device as part of an atomic operation together with the reading out and modifying of the data; and
   storing the modified data in the selected location only after verifying that the modified data can be written back to the selected location as part of the atomic operation.

2. A method according to claim 1, wherein reading out the data comprises obtaining a ticket from the storage device, the ticket indicating a status of the data, and wherein determining whether the modified data can be written back comprises evaluating validity of the ticket so as to verify that the status of the data on the storage device has not been changed since the ticket was obtained.

3. A method according to claim 2, wherein the ticket is indicative of the status of the data at a time at which the data were read out from the selected location, and wherein the ticket is invalidated if another one of the clients performed a storage operation to the selected location subsequent to the time at which the data were read out.

4. A method according to claim 2, wherein evaluating the validity of the ticket comprises submitting the ticket from the client to the storage device, and comparing the submitted ticket to a ticket copy held in a memory of the storage device.

5. A method according to claim 1, wherein storing the modified data comprises storing the data substantially without having obtained a lock on the selected location.

6. A method according to claim 1, wherein reading out the data comprises determining that another one of the clients is applying a modification to the data from the selected location, and wherein modifying the data comprises deciding how to modify the data responsive to a status of the modification being applied by the other one of the clients.

7. A method according to claim 6, wherein reading out the data comprises reading metadata from the selected location on the storage device, the metadata including a flag indicative of the status of the modification, and wherein deciding how to modify the data comprises making a decision on modifying the data responsive to the flag.

8. A method according to claim 7, wherein modifying the data comprises setting the flag to indicate the status of the modification.

9. A method according to claim 8, wherein storing the modified data comprises resetting the flag to a null value after the modification is completed.

10. A method according to claim 6, wherein deciding how to modify the data comprises determining that the modification applied by the other one of the clients has reached a no-return stage, and responsive to the no-return stage, deciding to help to complete the modification.

11. A method according to claim 10, wherein modifying the data comprises publishing the modification to be applied to the data, and wherein deciding to help comprises receiving the published modification, and helping to complete the modification responsive thereto.

12. A method according to claim 6, wherein deciding how to modify the data comprises deciding to interfere with the modification, so as to prevent the modification and enable the one of the clients to store its own modified data in the selected location.

13. A method according to claim 1, wherein reading out the data comprises reading metadata from the selected location on the storage device with respect to a data structure stored on the at least one storage device, the metadata including a metadata timestamp corresponding to a time at which a change was made in the metadata, and wherein determining whether the modified data can be written back to the selected location comprises verifying that the metadata are correct responsive to the metadata timestamp.

14. A method according to claim 13, wherein the data structure is one of a group of data structures consisting of a file and a directory.

15. A method according to claim 13, wherein the data structure comprises one or more data objects having respective data timestamps associated therewith, and wherein verifying that the metadata are correct comprises determining that another concurrent operation has not occurred by comparing the data timestamps to the metadata timestamp.

16. A method according to claim 1, wherein the storage device comprises an object-based storage device (OBSD), and wherein reading out the data comprises selecting an object on the OBSD, and reading out a range of the data from the object, and wherein storing the modified data comprises writing the modified data back to the selected object.

17. A method according to claim 16, wherein selecting the object comprises finding an entry in a file system directory stored on the OBSD that points to the object, the entry associating a name of a data structure in the file system with the object.

18. A method according to claim 17, wherein the data structure comprises a file, and wherein the object pointed to by the entry contains metadata of the file.

19. A method according to claim 18, wherein the metadata of the file points to one or more further objects containing the data to be read out.

20. A method according to claim 19, wherein coupling the plurality of the clients to communicate with the storage device comprises coupling at least first and second OBSDs to communicate with the clients, and wherein the metadata is on the first OBSD, while at least one of the further objects to which the metadata points is on the second OBSD.

21. A method according to claim 18, wherein modifying the data comprises performing an operation on the file, wherein the operation is selected from a group of operations consisting of creating the file, deleting the file, writing to the file and truncating the file.

22. A method according to claim 17, wherein the data structure comprises a subdirectory, and wherein the object pointed to by the entry contains further entries corresponding to entities in the subdirectory.

23. A method according to claim 1, wherein coupling the plurality of the clients to communicate with the storage device comprises connecting the clients and the storage device to communicate over a packet network.

24. A method according to claim 1, wherein coupling the plurality of the clients to communicate with the storage device comprises coupling multiple storage devices to communicate simultaneously with the clients, and wherein reading out the data comprises selecting one of the storage devices from which to read out the data.

25. A method according to claim 24, wherein storing the modified data comprises storing the data in a data file that is spread over two or more of the storage devices.

26. A method according to claim 24, wherein storing the modified data comprises storing the data substantially without dependence on communication among the multiple storage devices with respect to the operation.

27. A method according to claim 1, wherein storing the modified data comprises storing the data substantially without dependence on communication among the plurality of the clients with respect to the operation.

28. Apparatus for storing data, comprising:
at least one data storage device; and
a plurality of clients, coupled to the storage device by a communication network, each such client comprising a memory and a central processing unit (CPU), which is arranged to read out the data from a selected location on the at least one storage device to the memory of the client, to modify the data in the memory, and to submit the modified data to the at least one storage device for storage in the selected location, such that the modified data are stored in the selected location only after the at least one storage device has verified that the modified data can be written back to the selected location as part of an atomic operation together with reading out and modifying the data.

29. Apparatus according to claim 28, wherein the at least one storage device is adapted to issue a ticket to the client indicating a status of the data, and to determine whether the modified data can be written back to the location by evaluating validity of the ticket so as to verify that the status of the data on the at least one storage device has not been changed since the ticket was issued.

30. Apparatus according to claim 29, wherein the ticket is indicative of the status of the data at a time at which the data were read out from the selected location, and wherein the ticket is invalidated if another one of the clients performed a storage operation to the selected location subsequent to the time at which the data were read out.

31. Apparatus according to claim 29, wherein the at least one storage device comprises a memory, which is arranged to hold a copy of the ticket, and wherein the client is arranged to submit the ticket to the at least one storage device together with the modified data, and wherein the at least one storage device is arranged to evaluate the validity of the submitted ticket by comparing it to the copy held in the memory.

32. Apparatus according to claim 28, wherein the at least one storage device is adapted to store the modified data substantially without the client having obtained a lock on the selected location.

33. Apparatus according to claim 28, wherein the client is arranged to determine that another one of the clients is applying a modification to the data from the selected location, and to decide how to modify the data responsive to a status of the modification being applied by the other one of the clients.

34. Apparatus according to claim 33, wherein the data read out by the client from the at least one storage device comprises metadata including a flag indicative of the status of the modification, and wherein the client is arranged to make a decision on modifying the data responsive to the flag.

35. Apparatus according to claim 34, wherein the client is further arranged to set the flag to indicate the status of the modification.

36. Apparatus according to claim 35, wherein the client is arranged to reset the flag to a null value after the modification is completed.

37. Apparatus according to claim 33, wherein the client is arranged to determine that the modification applied by the other one of the clients has reached a no-return stage, and responsive to the no-return stage, to decide to help to complete the modification.

38. Apparatus according to claim 37, wherein the clients are arranged to publish the modification to be applied to the data, and wherein each of the clients is further arranged to decide to help to complete the modification based on the published modification.

39. Apparatus according to claim 33, wherein the client is arranged to decide to interfere with the modification, so as to prevent the modification and thus to store its own modified data in the selected location.

40. Apparatus according to claim 28, wherein the data read out by the client from the at least one storage device comprise metadata with respect to a data structure stored on the at least one storage device, the metadata including a metadata timestamp corresponding to a time at which a change was made in the metadata, and wherein the client is arranged to determine whether the modified data can be written back to the selected location subject to verifying that the metadata are correct responsive to the metadata timestamp.

41. Apparatus according to claim 40, wherein the data structure is one of a group of data structures consisting of a file and a directory.

42. Apparatus according to claim 40, wherein the data structure comprises one or more data objects having respective data timestamps associated therewith, and wherein the client is arranged to compare the data timestamps to the metadata timestamp so as to verify another concurrent operation has not occurred.

43. Apparatus according to claim 28, wherein the at least one storage device comprises at least one object-based storage device (OBSD), and wherein the client is arranged to select an object on the OBSD so as to read out a range of the data from the object, and to write the modified data back to the selected object.

44. Apparatus according to claim 43, wherein to select the object, the client is arranged to find an entry in a file system directory stored on the OBSD that points to the object, the entry associating a name of a data structure in the file system with the object.

45. Apparatus according to claim 44, wherein the data structure comprises a file, and wherein the object pointed to by the entry contains metadata of the file.

46. Apparatus according to claim 45, wherein the metadata of the file points to one or more further objects containing the data to be read out.

47. Apparatus according to claim 46, wherein the at least one OBSD comprises first and second OBSDs, and wherein the metadata is on the first OBSD, while at least one of the further objects to which the metadata points is on the second OBSD.

48. Apparatus according to claim 43, wherein the client is arranged to write the modified data back to the selected object so as to perform an operation on the file, wherein the operation is selected from a group of operations consisting of creating the file, deleting the file, writing to the file and truncating the file.

49. Apparatus according to claim 44, wherein the data structure comprises a subdirectory, and wherein the object pointed to by the entry contains further entries corresponding to entities in the subdirectory.

50. Apparatus according to claim 28, wherein the plurality of the clients are coupled to communicate with the at least one storage device over a packet network.

51. Apparatus according to claim 28, wherein the at least one storage device comprises multiple storage devices, which are arranged to communicate simultaneously with the clients, and wherein the client is arranged to select one of the storage devices from which to read out the data.

52. Apparatus according to claim 51, wherein the client is arranged to cause the modified data to be stored in a data file that is spread over two or more of the storage devices.

53. Apparatus according to claim 51, wherein the multiple storage devices are arranged to store the data substantially without dependence on communication among the multiple storage devices with respect to the operation.

54. Apparatus according to claim 28, wherein the plurality of clients are arranged to cause the at least one storage device to store the modified data substantially without dependence on communication among the plurality of the clients with respect to the operation.

55. A computer software product, comprising a computer-readable medium in which program instructions are stored, the instructions defining a file system for use by a plurality of client computers coupled by a communication network to communicate with at least one storage device, and which instructions, when read by a client computer among the plurality of client computers, cause the computer to read out the data from a selected location on the at least one storage device, to modify the data, and to submit the modified data to the at least one storage device for storage in the selected location, such that in accordance with the instructions, the modified data are stored in the selected location only after verifying that the modified data can be written back to the selected location as part of an atomic operation together with reading out and modifying the data.

56. A product according to claim 55, wherein the instructions cause the at least one storage device to issue a ticket to the client computer indicating a status of the data, and to determine whether the modified data can be written back to the location by evaluating validity of the ticket so as to verify that the status of the data on the at least one storage device has not been changed since the ticket was issued.

57. A product according to claim 56, wherein the ticket is indicative of the status of the data at a time at which the data were read out from the selected location, and wherein the ticket is invalidated if another one of the client computers performed a storage operation to the selected location subsequent to the time at which the data were read out.

58. A product according to claim 56, wherein the instructions cause the client computer to submit the ticket to the at least one storage device together with the modified data, and further cause the at least one storage device to hold a copy of the ticket, and to evaluate the validity of the submitted ticket by comparing it to the copy held in the memory.

59. A product according to claim 55, wherein the file system is substantially free of locks associated with interaction of the client computers with the at least one storage device.

60. A product according to claim 55, wherein the instructions cause the client computer to determine that another one of the client computers is applying a modification to the data from the selected location, and to decide how to modify the data responsive to a status of the modification being applied by the other one of the client computers.

61. A product according to claim 60, wherein the data read out by the client computer from the at least one storage device comprise metadata including a flag indicative of the status of the modification, and wherein the instructions cause the client computer to make a decision on modifying the data responsive to the flag.

62. A product according to claim 61, wherein the instructions cause the client computer to set the flag to indicate the status of the modification.

63. A product according to claim 62, wherein the instructions cause the client computer to reset the flag to a null value after the modification is completed.

64. A product according to claim 60, wherein the instructions cause the client computer to determine that the modification applied by the other one of the client computers has reached a no-return stage, and responsive to the no-return stage, to decide to help to complete the modification.

65. A product according to claim 64, wherein the instructions cause the client computers to publish the modification to be applied to the data, and further cause each of the client computers to decide to help to complete the modification based on the published modification.

66. A product according to claim 60, wherein the instructions cause the client computer to decide to interfere with the modification, so as to prevent the modification and thus to store its own modified data in the selected location.

67. A product according to claim 55, wherein the data read out by the client computer from the at least one storage device comprise metadata with respect to a data structure stored on the at least one storage device, the metadata including a metadata timestamp corresponding to a time at which a change was made in the metadata, and wherein the client computer is arranged to determine whether the modified data can be written back to the selected location subject to verifying that the metadata are correct responsive to the metadata timestamp.

68. A product according to claim 67, wherein the data structure is one of a group of data structures consisting of a file and a directory.

69. A product according to claim 67, wherein the data structure comprises one or more data objects having respective data timestamps associated therewith, and wherein the instructions cause the client computer to compare the data timestamps to the metadata timestamp so as to verify another concurrent operation has not occurred.

70. A product according to claim 55, wherein the at least one storage device comprises at least one object-based storage device (OBSD), and wherein the instructions cause the client computer to select an object on the OBSD so as to read out a range of the data from the object, and to write the modified data back to the selected object.

71. A product according to claim 70, wherein to select the object, the instructions cause the client computer to find an entry in a file system directory stored on the OBSD that points to the object, the entry associating a name of a data structure in the file system with the object.

72. A product according to claim 71, wherein the data structure comprises a file, and wherein the object pointed to by the entry contains metadata of the file.

73. A product according to claim 72, wherein the metadata of the file points to one or more further objects containing the data to be read out.

74. A product according to claim 73, wherein the at least one OBSD comprises first and second OBSDs, and wherein the metadata is on the first OBSD, while at least one of the further objects to which the metadata points is on the second OBSD.

75. A product according to claim 72, wherein the instructions cause the client computer to write the modified data back to the selected object so as to perform an operation on the file, wherein the operation is selected from a group of operations consisting of creating the file, deleting the file, writing to the file and truncating the file.

76. A product according to claim 71, wherein the data structure comprises a subdirectory, and wherein the object pointed to by the entry contains further entries corresponding to entities in the subdirectory.

77. A product according to claim 55, wherein the plurality of the clients are coupled to communicate with the storage device over a packet network.

78. A product according to claim 55, wherein the at least one storage device comprises multiple storage devices, which are arranged to communicate simultaneously with the clients, and wherein the instructions cause the client computer to select one of the storage devices from which to read out the data.

79. A product according to claim 78, wherein the instructions cause the client computer to arrange the modified data to be stored in a data file that is spread over two or more of the storage devices.

80. A product according to claim 78, wherein the multiple storage devices are arranged to store the data substantially without dependence on communication among the multiple storage devices with respect to the operation.

81. A product according to claim 55, wherein the instructions cause plurality of clients to cause the at least one storage device to store the modified data substantially without dependence on communication among the plurality of the clients with respect to the operation.

82. A device for storing data, comprising:

a storage medium arranged to store the data; and a processing unit coupled to control access by clients to the storage medium by providing an object-based interface to the clients, which interface enables the clients to select an object on the storage medium and to read out a range of the data from the selected object, to modify the data, and to submit the modified data to the processing unit for storage in the selected object, such that the processing unit allows the modified data to be stored in the selected object only after verifying that the modified data can be written back to the selected location as part of an atomic operation together with reading out and modifying the data.

83. A device according to claim 82, wherein the processing unit is adapted to issue a ticket to the client indicating a status of the data, and to determine whether the modified data can be written back to the selected object by evaluating validity of the ticket so as to verify that the status of the data on the at least one storage device has not been changed since the ticket was issued.

* * * * *